US005337043A

United States Patent [19]

Gokcebay

[11] Patent Number: 5,337,043

[45] Date of Patent: Aug. 9, 1994

[54] ACCESS CONTROL SYSTEM WITH MECHANICAL KEYS WHICH STORE DATA

[75] Inventor: Asil T. Gokcebay, San Francisco, Calif.

[73] Assignee: Security People, Inc., San Francisco, Calif.

[21] Appl. No.: 59,950

[22] Filed: May 10, 1993

Related U.S. Application Data

[63] Continuation of Ser. No. 343,663, Apr. 27, 1989, Pat. No. 5,245,329.

[51] Int. Cl.[5] .......................... G06K 9/78; G06K 9/62

[52] U.S. Cl. .......................... 340/825.31; 340/825.34; 382/2; 382/4; 235/382.5

[58] Field of Search .......................... 70/277, 278, 409; 361/172; 382/1-5; 235/380, 382, 382.5; 340/825.3, 825.31, 825.34, 825.69, 825.72; 356/71

[56] References Cited

U.S. PATENT DOCUMENTS

| | | | |
|---|---|---|---|
| 3,584,958 | 6/1971 | Miller | 356/71 |
| 3,654,522 | 4/1972 | Issertedt . | |
| 3,733,862 | 5/1973 | Killmeyer | 70/277 |
| 4,144,523 | 3/1979 | Kaplit . | |
| 4,303,852 | 12/1981 | Silverman et al. | 340/825.34 |
| 4,326,124 | 4/1982 | Faude . | |
| 4,532,508 | 7/1985 | Ruell . | |
| 4,538,056 | 8/1985 | Young et al. . | |
| 4,542,465 | 9/1985 | Stockburger et al. . | |
| 4,582,985 | 4/1986 | Löfberg . | |
| 4,633,687 | 1/1987 | Fane . | |
| 4,712,103 | 12/1987 | Gotanda . | |
| 4,723,427 | 2/1988 | Oliver . | |
| 4,729,128 | 3/1988 | Grimes et al. | 340/825.34 |
| 4,734,693 | 3/1988 | Dluhosch . | |
| 4,760,393 | 7/1988 | Mauch . | |
| 4,789,859 | 12/1988 | Clarkson et al. . | |
| 4,831,374 | 5/1989 | Masel . | |
| 4,835,407 | 5/1989 | Katoaka et al. . | |
| 4,983,036 | 1/1991 | Froelich | 356/71 |
| 4,995,086 | 2/1991 | Lilley et al. | 340/825.34 |

FOREIGN PATENT DOCUMENTS

| | | |
|---|---|---|
| 3615207 | 11/1987 | Fed. Rep. of Germany . |
| 2565007 | 11/1985 | France . |
| 2587522 | 3/1987 | France . |
| 63-255782 | 10/1988 | Japan . |
| 8706378 | 10/1987 | PCT Int'l Appl. . |
| 2171828 | 9/1986 | United Kingdom . |

*Primary Examiner*—Donald J. Yusko
*Assistant Examiner*—John Giust
*Attorney, Agent, or Firm*—Thomas M. Freiburger

[57] ABSTRACT

An access control system combines card type keys or mechanical keys and lock cylinders with keyholder authentication, so that only the authorized keyholder or keyholders can use a key at an access control point. The access control point can be a door, gate, drawer, safe, safety deposit box, computer terminal or other situation wherein high security is desirable. In a preferred embodiment, the access control system includes a series of mechanical keys (or card type keys) having encoded data stored on the bottom edges of the keys. The encoded data may be in the form of a bar code or optical data storage, either directly formed onto the key or on a strip of plastic or other material bearing the encoded data, secured to the key. In one form of the invention, user authentication involves a biometric feature such as a fingerprint of the intended keyholder. The fingerprint is digitized, encoded and placed on the bottom edge of the mechanical key for that intended keyholder, preferably along with an encoded keyholder identifying number. An authentication reader at a high security access control point includes a keyway with a reader for the encoded data representing the encoded fingerprint, and also a fingerprint reader for reading the user's fingerprint at each instance of attempted entry. Comparison of the attempted user's fingerprint with the stored fingerprint is preferably made directly at the access control point, so that only the access decision and a keyholder identifying code need to be sent to a central processor.

8 Claims, 8 Drawing Sheets

ACCESS CONTROL SYSTEM WITH MECHANICAL KEYS WHICH STORE DATA

This is a continuation of co-pending application Ser. No. 07/343,663 filed on Apr. 27, 1989, now U.S. Pat. No. 5,245,329.

BACKGROUND OF THE INVENTION

This invention relates to access control, and more particularly it is concerned with a high security access control system involving credit card type keys or mechanical keys and locks as well as keyholder authentication to prevent unauthorized use of a key.

A number of different types of access control systems and devices have existed in use or in previous patents—for example, the systems of National Computer Systems, Inc. and Continental Instruments, Inc.

Cylinders and keys having mechanical configuration in combination with electrical, magnetic or optical locking or unlocking devices have also been known. See, for example, U.S. Pat. Nos. 4,603,564, 4,658,105, 4,633,687, 4,458,512, and 3,733,862. In some of these devices, keys and cylinders could be coded by the manufacturer or by the user, with the non-mechanical aspect of the key affording additional security against opening of a lock without the proper key. In these combinations of mechanical and non-mechanical security features on a key, the non-mechanical code or configuration or pattern simply added to what was required to open the lock, generally not carrying other readable data useful for other purposes.

U.S. Pat. No. 4,537,484 shows one example of a fingerprint reader system for use in identity verification. Another such reader is manufactured by ThumbScan, Inc. of Oakbrook Terrace, Ill., for the purpose of computer terminal security. Such scanners have also been suggested for use in identification in access control systems involving granting of entry only to authorized persons. However, these systems have not cooperated with keys and locks which could be used in the same facility. Also, they have generally required processing of the attempted user's fingerprint in a central processor which would have to either compare the attempted user's fingerprint with hundreds or thousands of stored fingerprints in a database, or would receive a user identification number keypunched in by the person seeking access, and then look up a database-stored fingerprint corresponding to that code and make the comparison. Such a central look-up and comparison would involve a great deal of central computer memory and power, and the use of many-conductor bus cables between each access control point and the central processor, and would tend to require considerable time or a very high powered computer, to complete the access control decision. This equipment and installation of the cables can involve great cost, particularly when added to an existing building.

A different approach to access control decision making is taken by the present invention described below. In a preferred embodiment, a keyholder carries a key which not only has a mechanical configuration for accessing mechanical locks (or a card type key with non-mechanical lock access features), but also carries encoded data representing a personal identifying code or feature of the keyholder, as well as a simple identity number or code. The high security authentication comparison can be made directly at the access control point, by a small processor board located behind a reader panel.

SUMMARY OF THE INVENTION

In accordance with the access control system of the present invention, the system includes a series of mechanical keys or card type keys (electronic, magnetic, hole-punched, etc.) which can optionally be high security keys themselves. At least some of the keys carry encoded data which represent a personal feature of the intended keyholder assigned to that key. In preferred embodiments, the personal identifying or authenticating feature of the keyholder is a "biometric" feature, such as a fingerprint, a retina scan, a facial photograph or other feature unique to the intended keyholder. A retina scanner is disclosed in U.S. Pat. No. 4,685,140, for example.

The encoded data preferably is placed on the bottom edge of a mechanical key, and may it be in a groove formed in that edge of the key. Alternatively, the data may be placed on one surface of the key's head. It may be read by swiping it through a reader slot. On a card type key the encoded data can be in a stripe on the card surface. Optical data storage such as used in audio and video discs may be used, or high-density optical storage such as disclosed in U.S. Pat. Nos. 4,145,758, 4,304,848 or 4,503,135.

The key also has a mechanical configuration (or lock accessing feature) matched to certain mechanical lock cylinders (or non-mechanical locks) to which the intended keyholder is to have access. Some of these may be lower security areas, and some may combine the mechanical or non-mechanical lock features with the user authentication access control feature, for high security.

It is a central feature of the present invention, and an important distinction from prior access control systems or high-security keys, that the key itself bears encoded data which is not merely picked up by the lock apparatus to establish a higher security in allowing rotation of a lock cylinder (or opening of a non-mechanical lock), but which carries digitized information relating to a personal authenticating feature of the intended user of the key, for reading and making a comparison before access is granted to the attempted user.

At some high-security access control point in the system, the keyholder places his key into a keyway or slot or against a reader, which reads the encoded, digitized information which relates specifically to the intended keyholder. This information as read is briefly stored in a memory associated with a small processor connected to the key reader. The keyholder may then be prompted to place a selected finger against a transparent window of a fingerprint reader. The fingerprint reader scans the fingerprint, and this scanned information is compared with the encoded information. It should be understood that other features unique to the intended keyholder can be used, as mentioned above such as a retina scan or a photograph.

If the actual fingerprint as read matches sufficiently closely to the fingerprint as encoded and stored on the key, a provisional decision is made by the small processor to grant access to the keyholder. In some applications a time/date access decision will also be required, with that decision made by a central processor, based on whether the particular keyholder is to be permitted access to that area at that particular time.

Optionally the keyholder can also be required to use his key to access a lock at the same location. The key can be used to rotate one cylinder, for example, while a second lock or bolt is released electrically, automatically, based on the decision of the system to grant access.

In a preferred embodiment the keyholder can be granted access by an electric release or electric strike based on the positive user authentication decision (with or without time/date decision from a central processor, as above), without using the mechanical key configuration (or other lock accessing features). In this case, the mechanical key configuration is used for other locks in the system, wherein lower security is required, with the encoded key enabling the keyholder to carry only one item for access to all permissible locks. With the authentication comparison made directly at the access control point, and no personal authentication (e.g., fingerprint) data required to be imported from any remote database at a central computer, the access control system of the invention can employ only a very small cable connecting each access control point to the central processor, e.g. two conductors, for time/date decision from the central processor and for reports to the central processor. Whenever access is attempted, the small local processor at the access control point can send a report which includes an identification of the keyholder, derived from encoded information on the key, and a "yes" or "no" decision as to whether access was permitted. The time of day and the access control point location can be added to the report by the central processor.

The system also enables access management for allowing different personnel entry at different times of day or different days of the week or calendar days, etc. The small on-site processor can be programmed to allow access to certain personnel by personnel code or number (at certain times), but preferably, for large numbers of personnel this is controlled by the central processor (again via a simple two-conductor cable). This can be adjusted, or access can be canceled for certain personnel (such as discharged employees) by instruction input at the central processor.

In another preferred embodiment of the invention, at each high-security access control point there is a keyway configured specifically for keys of keyholders who are to have access at this point. The keyway is at the key reader, instead of (or in addition to) the keyway being in a lock cylinder. When a key of the correct type is inserted into this keyway, the reader scans the encoded data. Keys of the wrong mechanical configuration cannot be inserted, so that access will not be possible. The keyway can be of a high-security type, rather than one in common use.

In addition, a high-security key cut configuration can be used, such as of the type shown in U.S. Pat. Nos. 4,635,455 and 4,732,022 assigned to Medeco Security Locks, Inc. Such key cuts are made at an oblique angle with respect to the side faces of the key. For the purposes of this invention, at least one pin can be cooperative with the keyway, with the pin having an angled bottom end which becomes rotationally oriented when it engages against the angle cut key. If the pin does not engage properly against the key's angle cut, access can be automatically denied (even though the keyholder identification will preferably still be read from the key). This enables a report to be made to the central processor, regarding the attempted entry, and the fact that a certain keyholder's key was apparently defective or was attempted to be used improperly, at the wrong access control point.

An alarm can be activated under such condition of attempted improper key use, or a silent signal can be sent elsewhere in the system where preferably personnel will be alerted.

The same alarm or signal can be sent whenever access is denied in any of the various forms of the system of the invention, and for any reason, including the reason that the keyholder's fingerprint (or other personnel identifier) did not match the code on the key.

If desired for extra security, the keyway provided at the key code reader can comprise an actual lock cylinder which must be rotated before a positive access decision can be completed. Such a cylinder can include a full compliment of pins in a nigh-security configuration if desired, so that a combination of user authentication and mechanical keying is relied upon for added security.

In one aspect, the invention comprises a card type or mechanical key, either of the pin type or of other high-security type currently in use, such as the dimple type or the tubular type, in combination with encoded data secured to the key—data which is readable by a scanner or reader and which does not directly help enable the keyholder to rotate the key in a lock. Instead, the encoded data is representative of some personal identifying, authenticating feature known by or held by or on the person of the intended keyholder. Such an authenticating feature preferably comprises a biometric feature such as a fingerprint scan, a retina scan, a voice pattern or a facial photograph; more broadly speaking, however, it can include other items such as a memorized number or code which is known only to the intended keyholder or keyholders and which must be input to a keyboard by the keyholder to be matched with what is read from the key. The prior art did not contemplate a mechanical key which itself bore such separate data which would enable authentication of the keyholder attempting access.

The encoded information on the key, if it represents fingerprint, retina scan, voice or other characteristic of the intended keyholder, also preferably includes a central keyholder number or code, for the purpose of reporting the identity of the intended keyholder in a transaction record whenever the key is attempted to be used for access.

In another aspect the invention comprises a card type key having normal lock accessing features, encoded data relating to the personal authenticating feature, and a photograph of the intended user, with other appropriate printed matter to allow the card to be used as an identifying card or badge. In a still further aspect, the card can at a minimum have encoded data carrying a biometric feature to be used in an access control system of the invention having corresponding biometric readers (e.g. fingerprint).

It is therefore among the objects of the present invention to improve over previous access control systems and high-security mechanical key systems by encoding keys with a user authentication code which can be read by scanners or readers at access control points, so as to prevent anyone but an authorized, intended keyholder from gaining access at such control points. An associated object is to provide an access control system wherein the key configuration or access control feature is effective to open locks at other points where keyholder authentication is not required, thus enabling personnel to carry only one key for access to both high-security points and lower-security points. These and other objects, advantages and features of the invention will be apparent from the following description of preferred embodiments, considered along with the accompanying drawings.

DESCRIPTION OF PREFERRED EMBODIMENTS

Figure 1:
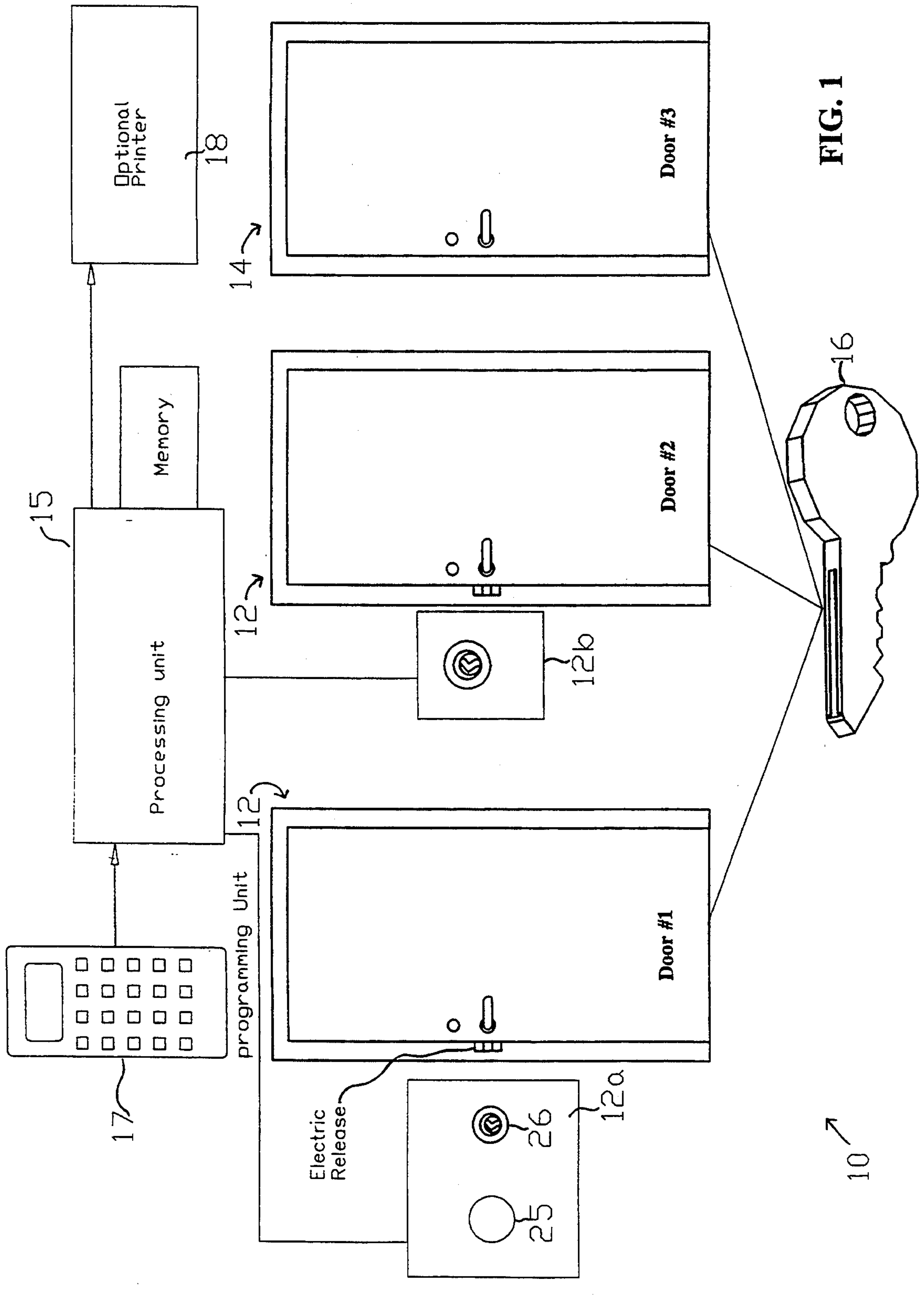
FIG. 1 is a diagrammatic drawing indicating components of an overall access control system in accordance with the principles of the present invention.

In the drawings, FIG. 1 shows schematically an access control system 10 in accordance with one embodiment of the present invention. Principal components of the system 10 include a series of high security access control points 12, including different security levels at **12*a* and 12*b*, and a series of lower security access control points 14. The system also includes a central processor unit 15 with associated memory, as well as a number of distributed mechanical keys 16** which are controlled in distribution and each registered to a specific intended keyholder or keyholders.

As schematically indicated in FIG. 1, the processor unit 15 is connected only to the high security access control points 12. The processor 15 may have a programmer unit 17 and an optional printer 18 connected to it.

Figure 2:
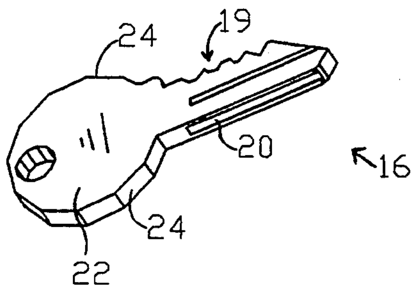
FIG. 2 is a view showing a mechanical key forming a part of the system of the invention in one embodiment, with encoded data formed on or secured to the key.

As illustrated in FIG. 2, a mechanical key 16 as used in the system includes a mechanical configuration 19 for engagement with a mechanical lock, and it also includes encoded data related to high security access control located, for example, at a position 20 on or in the bottom edge of the key 16. The encoded data may alternatively be located on the head 22 of the key or on another edge, such as edges 24 of the key head 22. In these alternate locations the encoded data can be read by placing the key against a reader, or by insertion into a slot or by swiping through a slot.

Although FIG. 2 shows a conventional mechanical key configuration, for use with pin and shear plane type rotatable lock cylinders, the mechanical key 16 can also be of the higher security type with angle cuts as shown in U.S. Pat. No. 4,732,022 referenced above, or it can be a tube-shaped key of type often used on computers and burglar alarms, etc., or a dimple type key or any other type of mechanical key.

It should be understood that the present invention also applies to credit card type keys, hole punched type flat keys, and other flat plastic or metal card type keys, as well as conventional mechanical keys. The term "key" as used herein and in the claims is intended to encompass all such keys, except accompanies by the term "mechanical."

Figure 10:
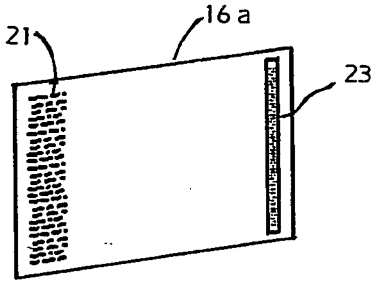
FIG. 10 is a perspective view showing a credit card type key with non-mechanical lock access features and with encoded data representing a personal identifying feature of-the keyholder.

An example of one kind of credit card type key **16*a* is shown in FIG. 10. All of FIGS. 1 and 3 through 9, and the accompanying description, should be understood as encompassing the use of any of a number of such card type keys, in many different configurations and with different types of lock accessing features. The card type key 16*a* in FIG. 10 may have hole-punched type lock access features 21, and a small strip of encoded data 23** carrying the personal identifying feature, such as a biometric feature.

Each key has two separate functions—a mechanical function of opening mechanical (or magnetic, hole-punch, etc.) locks in the system, and an electronic or data function involving the carrying of data as discussed above. The data borne by the key 16, in accordance with preferred embodiments of the invention, does not itself open a lock or help enable opening of a lock or enable access at an access control point. Rather, it includes information specific to the intended keyholder, for authenticating the keyholder when access is attempted by a keyholder using the key. At the minimum, the encoded data will include a personal code, e.g. a combination of numbers which are memorized by the intended keyholder and which only the intended keyholder (and perhaps supervisory personnel) is supposed to know. A comparison is made between the encoded information, or some of the encoded information from the key, and similar information input in another way (e.g. input manually by the keyholder on a number keyboard or input via fingerprint).

Thus, the system of invention differs from prior systems, even in the form of the minimum system just described, in that when access is attempted, the system does not retrieve a secret code from a central database or processor, for comparison with a code input by the attempted user. Instead, the secret code is carried on the key itself, and can be read by a small local processor at the access control point and there compared directly with a code input by the attempted user. The on-site comparison is one important feature of the invention.

However, in preferred embodiments of the invention the keyholder authenticating data carries not merely a secret number or code memorized by and known only to the intended keyholder, but instead or in addition carries data related to a personal identifying characteristic or biometric feature of the intended keyholder. This identifying biometric feature or characteristic advantageously can be the intended keyholder's fingerprint, but it could also be any other unique personal characteristic as discussed above, such as a digitized facial photograph or a voice pattern or even a retina scan.

Figure 3:
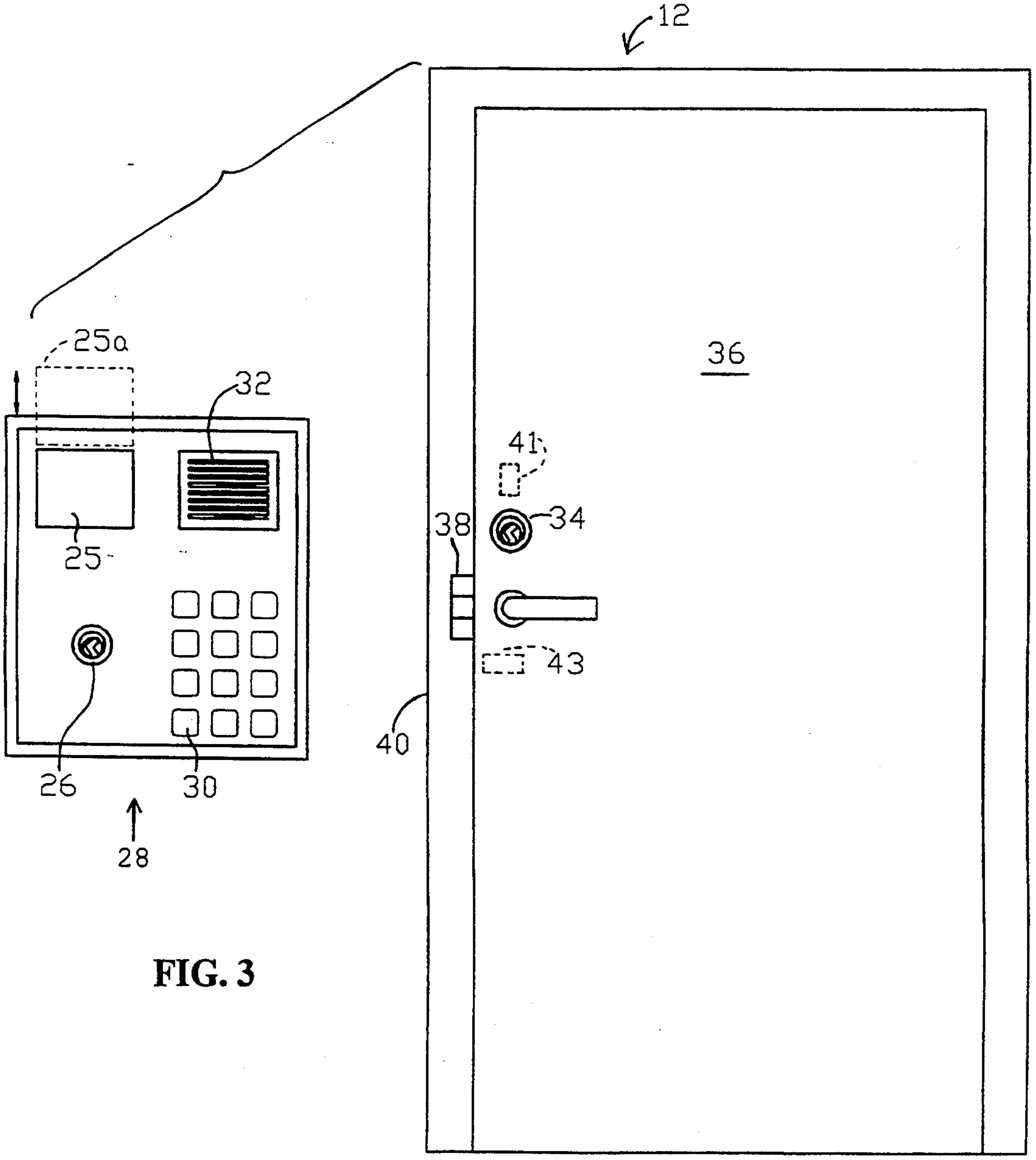
FIG. 3 is a frontal elevation view illustrating elements of the system of the invention in a preferred embodiment, at one access control point in the system.

At each high-security access control point in such a preferred system, there is provided both a key reader for reading the encoded data on the key, and a reader of the attempted user's biometric feature such as fingerprint, voice pattern, photograph, retina scan, etc. FIG. 3, showing an example of a high-security access control point, shows a fingerprint reader window 25 and a keyway 26 for reading of the encoded data on the key. A reader panel 28 shown in FIG. 3 also may include an optional key pad 30, for manually inputting a code, which can be an alternative to a fingerprint reader or other personal identifying feature reader as discussed above, in a simple form of the system.

Fingerprint readers are well Known and well developed. For example, see U.S. Pat. No. 4,537,484 referenced above. Retina scanners are also known and effective for distinguishing between individuals and matching a known retina scan of a person, as discussed above. If a retina scanner is used in the system of the invention, the window 25 can have behind it a retina scanner. However, many individuals may find retina scanners objectionable.

An individual's facial photograph can be digitized and stored as encoded data carried on the key 16. The window 25 in FIG. 3 can have behind it a camera, such as a video camera, for producing a video image which can be scanned by associated electronics and compared with the image encoded on the key 16, to determine whether a close enough match exists.

If voice identification is used, a microphone can be included on the panel 28 shown in FIG. 3, indicated as grid lines 32 in FIG. 3.

It should be understood that ordinarily not all of the items 25, 30 and 32 will be included on the access control panel 28—they are illustrated primarily as alternatives.

When a keyholder approaches a high-security access control point such as exemplified in FIG. 3, he may not be required to actually use his key in a keyway (indicated at 34) of the door, gate, computer, safe, drawer, etc. Instead, the keyholder positions his key 16 in a position to be scanned for the encoded data (as by inserting it into a keyway such as shown at 26) and he inputs his personal identifying or authenticating feature, e.g. his actual fingerprint, to be compared with the data from the key, using the panel 28. If a match is found, access preferably is granted electrically (optionally other criteria may first be required as described below). Thus, if the access control point has a door 36 such as shown in the example of FIG. 3, the panel electronics can actuate an electric release 38 in the door jamb 40, or an electric strike 41 in the door 36. This enables the authenticated keyholder to merely pull or push the door 36 open, without rotation of any lock cylinder in the door.

However, in an embodiment of the invention the keyholder may also be required to use his key 16 in a keyway 34 in the door. For example, the door may include a deadbolt or catch (not shown) which cannot be released by any key within the possession of a certain class of personnel, but which will be released, allowing the door to open, by an electric door jamb release mechanism 38 or electric strike mechanism 41 controlled by the panel 28. In addition, a different mechanical strike or deadbolt 43 can be controlled by the mechanical lock cylinder 34, which the authenticated keyholder will be required to use in addition, when access has been granted electronically via the panel 28. This can also serve as mechanical backup security in the event the electronic system is shut off or malfunctions.

Alternatively, a keyway 34 can be provided in the door which will receive a different key, other than the key 16 in the possession of the keyholder. The special key for the keyway 34 can override the electronic system under certain conditions such as an emergency, but with special high-security keys for this keyway 34 only possessed by certain high-security personnel. In addition, preferably a record is made and sent to a central processor whenever the door is opened by such a special key, without authentication via the panel 28. This is discussed further below with reference to FIGS. 4 and 5.

As another alternative, the keyway 34 shown in the door 36 can fit the keyholder's key 16, but with the cylinder associated with keyway 34 normally disabled against unlocking the door in this way, thus normally requiring the panel 28 to release the door. The disabling mechanism for the key cylinder 34 can be electrically released, such as in times of emergency or certain times of day when high-security access control is not required. During these periods, access can be gained, e.g. the door 36 can be opened, merely using the mechanical key 16 and the keyway 34, in the conventional manner.

Such a cylinder's disabling mechanism can simply be a solenoid operated or otherwise electrically actuated pin internal to the door 36, which locks the cylinder 34 against rotation except when electrically released.

FIG. 3 shows an optional door or cover **25*a* (dashed lines) which can be included to cover the reader window 25 when not in use. The cover 25*a* can be slidable and solenoid operated—normally closed but openable automatically when a key is inserted in the keyway 26. The cover can comprise a pair of doors which slide in and out from left and right or top and bottom. In a system with date/time access control the opening of the cover 25*a*** can be delayed until after a signal is received from the central processor authorizing entry to the particular personnel number or key number at the particular time.

In preferred embodiments of the overall system of the invention, once the keyholder has gained access at the access control point 12 shown in FIG. 3 (e.g. he has opened the door 36 and entered), the keyholder may encounter additional high-security access points 12, or he may simply encounter lower security access points 14 (FIG. 1). These latter access points 14 will require only the mechanical key 16 with its configuration 19, without use of the encoded data. In this way, the single access item (the mechanical key) is used for several purposes within the system.

FIG. 1 shows that the high-security access control points 12 may include different levels of security. The highest security is illustrated at 12*a*, where a fingerprint verification reader 24 and a keyway for a key code reader 26 are both included; at 12*b*, only the keyway/-key reader 26 is included, without fingerprint verification. At this type access control point, the key identification number or code is read from the key and sent to the processor unit 15, which will send back a signal to grant access only if the person associated with that key number is to be admitted at the particular date and time involved. This information is stored in memory at the processor 15.

Similarly, time/date control may be a part of the access decision at all or some high-security points 12*a* depending on the type of facility and whether differentiation is needed among personnel and as to dates and times of permitted access. Each user's key preferably includes the encoded key number or ID number which is read by the key reader. This is sent to the central processor 15, which determines whether access is restricted at this particular time, and sends back a signal to the panel 28 confirming or denying access. This decision, as well as the comparison, must be positive for access to be granted.

Figure 4:
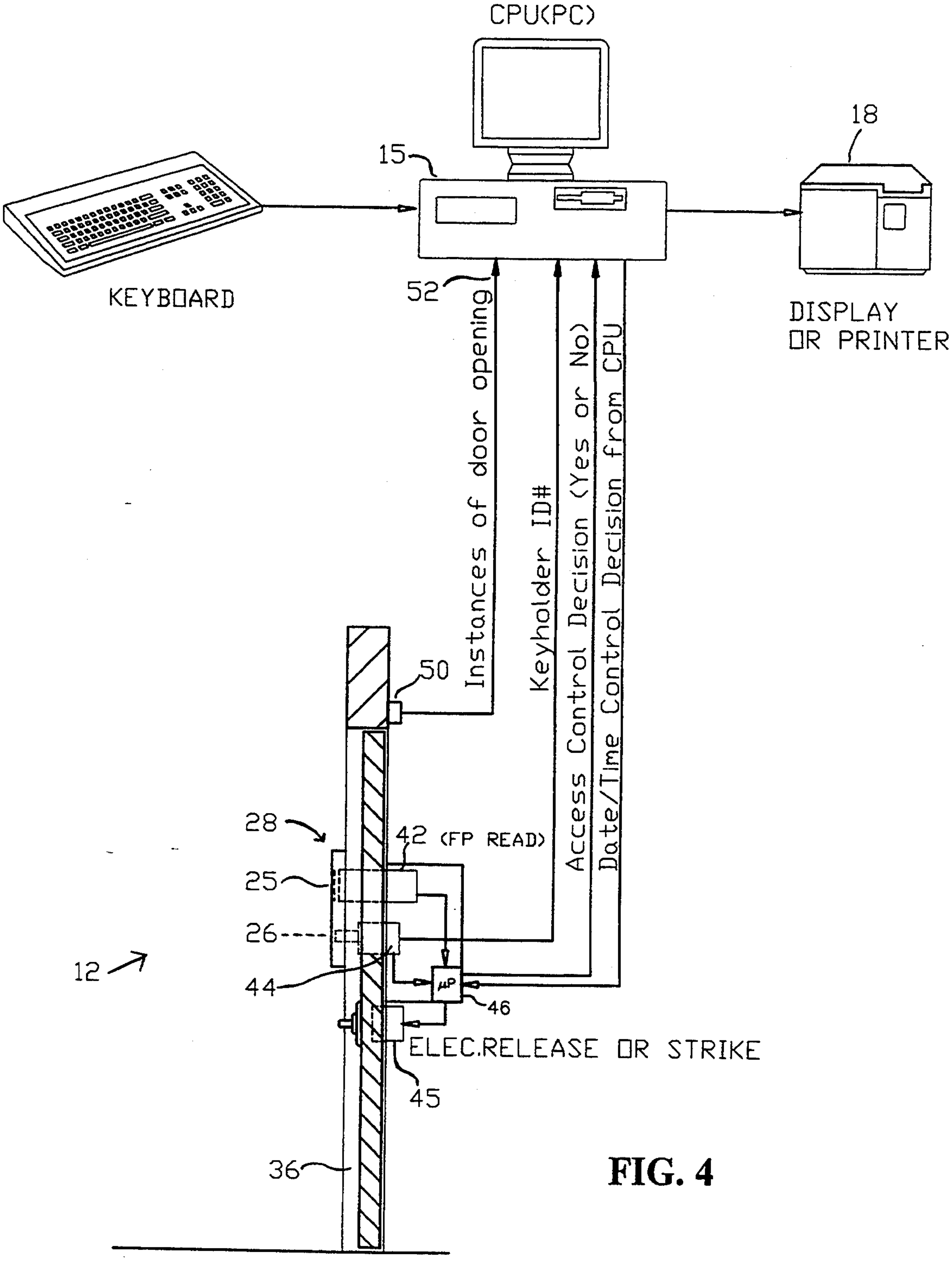
FIG. 4 is a schematic system diagram partially in the form of a block diagram, indicating several access control points and security components, and indicating some information and control flow to and from a central processor, in accordance with one embodiment of the system of the invention.

FIG. 4 is another schematic representation showing several access control points including a high-security access control point 12, in elevational section. Various components of the security panel 28 are shown, as well as connection to the central processor 15. As in FIG. 3, FIG. 4 shows the system with a fingerprint reader 42, behind the window 25, as one preferred embodiment; however, it should be understood that other types of personal authentication biometric feature reading devices may be substituted for the fingerprint reader 42, as mentioned above.

Figure 5:
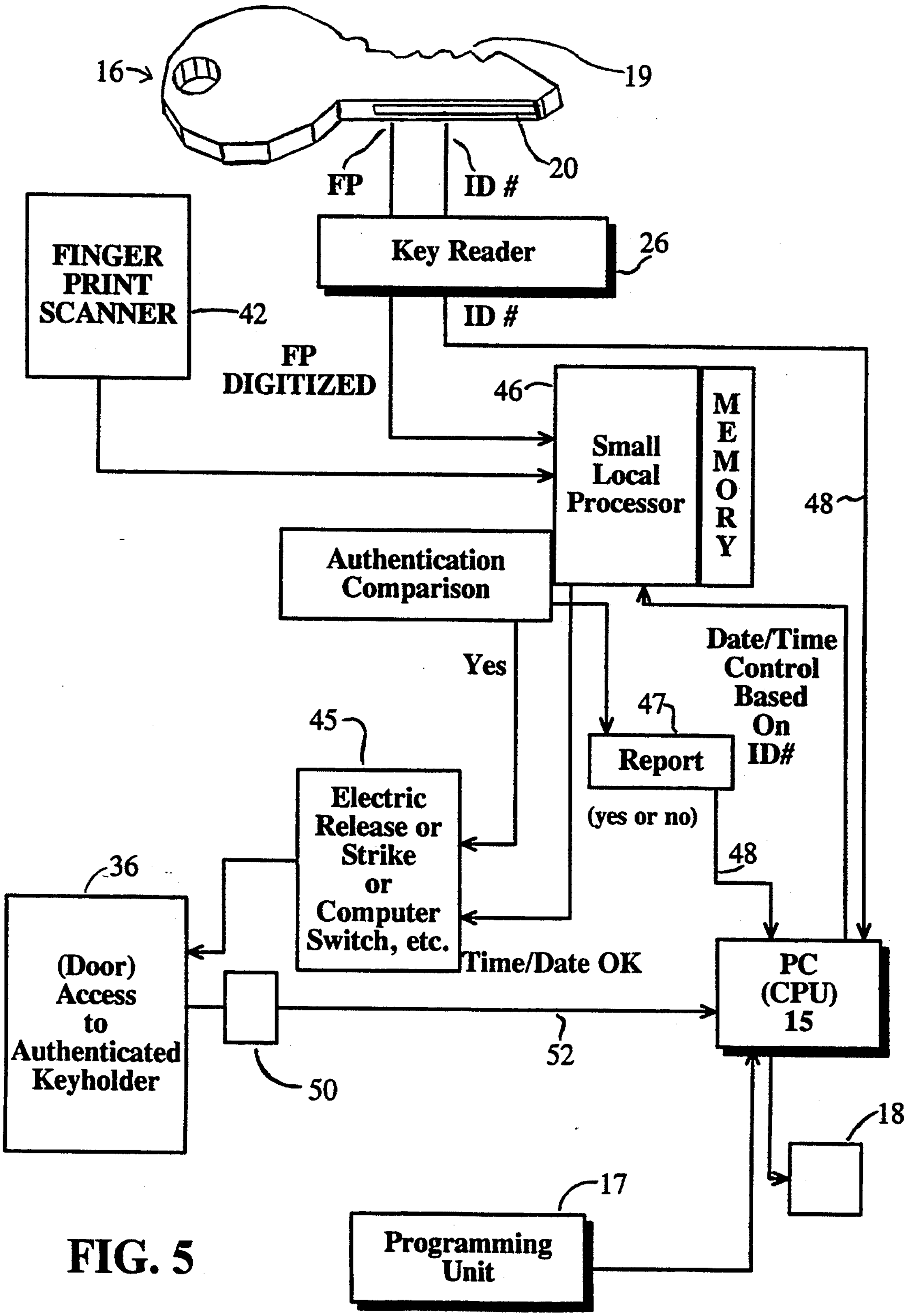
FIG. 5 is a schematic block diagram indicating information which might be included in the encoded data on the mechanical key indicated in FIG. 2, and illustrating flow of information from the key and from a fingerprint scanner which may be included, and showing operation of the system to grant access or deny access and to make reports.
Figure 6:
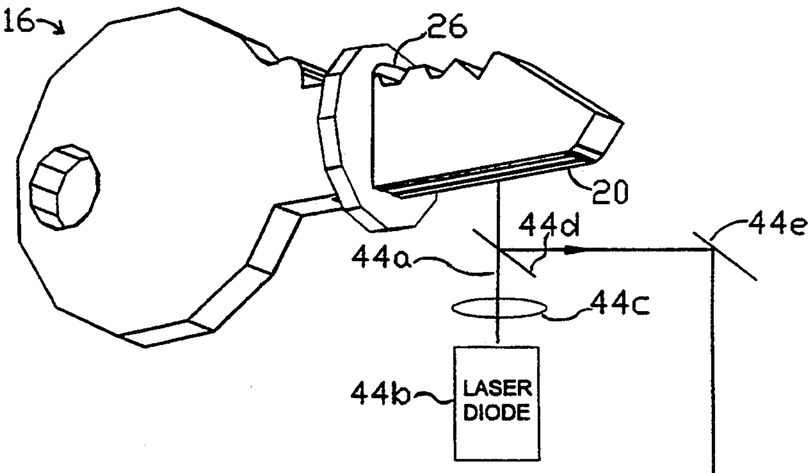
FIG. 6 is a schematic view, partially in perspective, showing elements of an optical key reader which may be included in the system of the invention.
Figure 6:
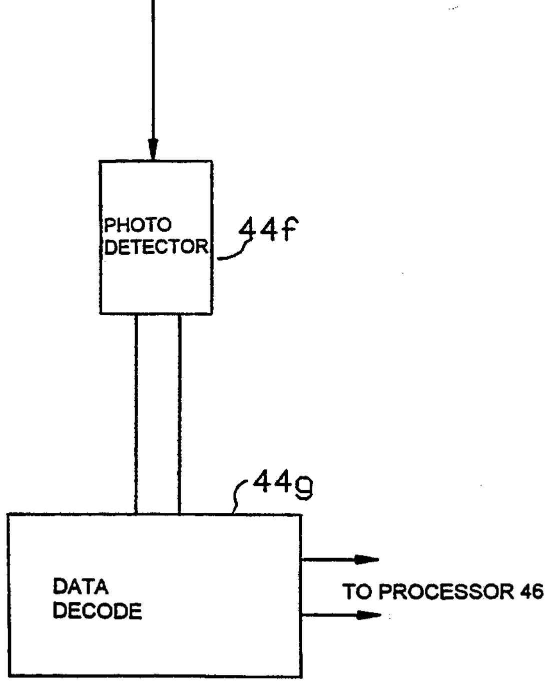

As indicated in FIG. 4, and also in reference to FIG. 5, the control panel includes a key scanner or reader 44 for reading the encoded data on the key. This may be associated with a keyway 26 as illustrated in FIG. 3, although the encoded data be alternatively be on the head of the key (or on a card key, as discussed above), with the key simply placed up adjacent to the key scanner 44.

If a keyway is included, the encoded data (which may be optically encoded) may be scanned using the movement of the key in entering the keyway. This is shown schematically in FIG. 6. Data on the key, which may be encoded in the recess 20, is scanned by a beam such as a focused laser beam 44*a* emanating from a laser diode 44*b* and focused by focusing optics 44*c*. As the key 16 is mushed into the slot or keyway 26, the encoded information is moved mast the beam 44*a* and this movement produces a scan, eliminating the need for a beam scanner. A reflection signal from the encoded information returns and is reflected by a beam splitter mirror 44*d* and another mirror 44*e* to a photodetector 44*f*. The electrical voltage signal from the detector 44*f* is fed to a special data decode processor 44*g* and the decoded signal is sent to the local processor 46. Alternatively, the raw signal from the detector 44*f* can go directly to the local processor 46, provided with decode software.

FIGS. 4 and 5 also show schematically an electric release or electric strike 45 in the door jamb or door, to be activated by the panel 28 when a keyholder is authenticated and granted access.

A small local processor 46 at the panel 28 receives inputs from the electronic key scanner 44 and from the fingerprint reader 42, with the scanned fingerprint preferably digitized in the manner the encoded data is digitized. The processor 46 makes a comparison to determine whether the live fingerprint just scanned is close enough to the fingerprint data as digitized in the encoded data to constitute a match, within preset criteria, and if so, a preliminary decision is made to grant access. If time/date control is not included the electric release or electric strike may be activated at this point to admit the person.

At the same time, as shown in FIGS. 4 and 5, the key scanner or reader 44 preferably reads an encoded identifying number (or other ID code) from the data carried by the key, and this information is sent to the central processor 15. It can either go into the local processor and from there to the central processor in a report, or directly to the central processor as shown in FIG. 5, to be there correlated with an authentication report as discussed below.

If date/time access control is desired, this ID information is used by the central processor 15 to determine (via a database) whether access should be granted at this time. As indicated in FIG. 5, and in the flow chart of FIG. 8, both "yes" decisions are required in order for the electric release or strike 45 to be activated. The central processor looks up the ID number and checks whether that ID number should be permitted entry at the particular date and time of attempted entry.

The ID information is also used to make a record of the transaction in the central processor 15. A transaction record or report 47 (FIGS. 5 and 8), sent to the central processor 15, can comprise only the access decision, i.e. yes or no, from the authentication comparison. A signal carrying this information can be sent to the central processor with a simple two-conductor cord, indicated by a line 48 shown in FIGS. 4 and 5. In the central processor 15 this report is correlated the personnel or key identifying number or code (ID number), which has been received almost simultaneously.

Figure 8:
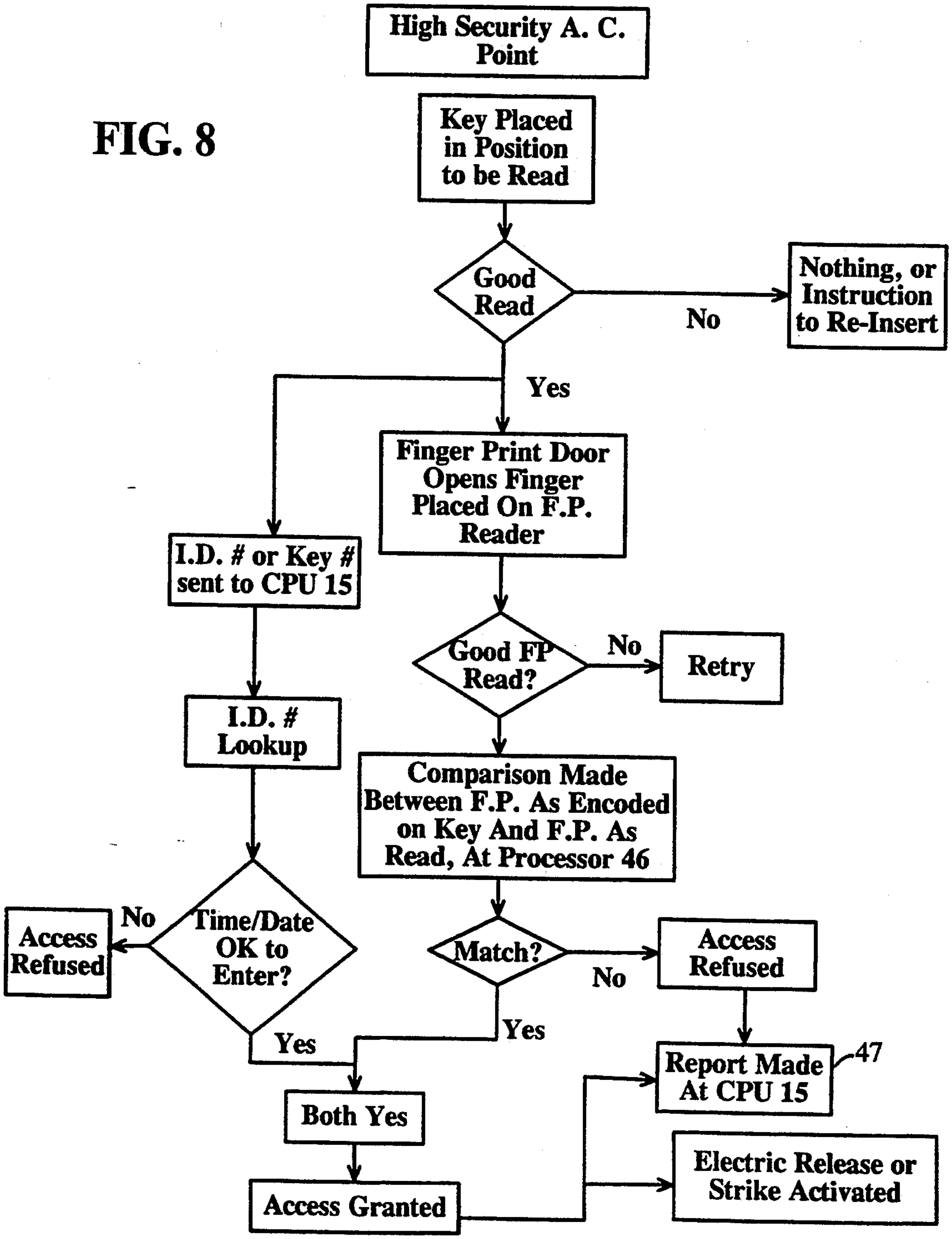
FIG. 8 is a flow diagram indicating operation of the system in accordance with one preferred embodiment of the invention.

The flow chart of FIG. 8 outlines functions carried out in a preferred embodiment of the system of the invention. These functions are illustrated without regard to which processor or other element is used to perform each function. The flow chart does not need further explanation, beyond the description on the chart and the description herein.

FIG. 4 also indicates a form of switch 50, such as a mechanical limit switch or photoelectric sensor, which optionally may be actuated every time the door or gate or drawer, etc. 36 is opened. This information can be sent to the central processor (via line 52, which can be the same conductor wire as represented by the line 48), and it will normally match a positive access decision as described above. If the door is ever opened in the absence of a positive access decision, a report of such occurrence can be made by the central processor (it can be printed out via the printer 18). An audible alarm and/or indicator light can also be activated, if desired.

Figure 7:
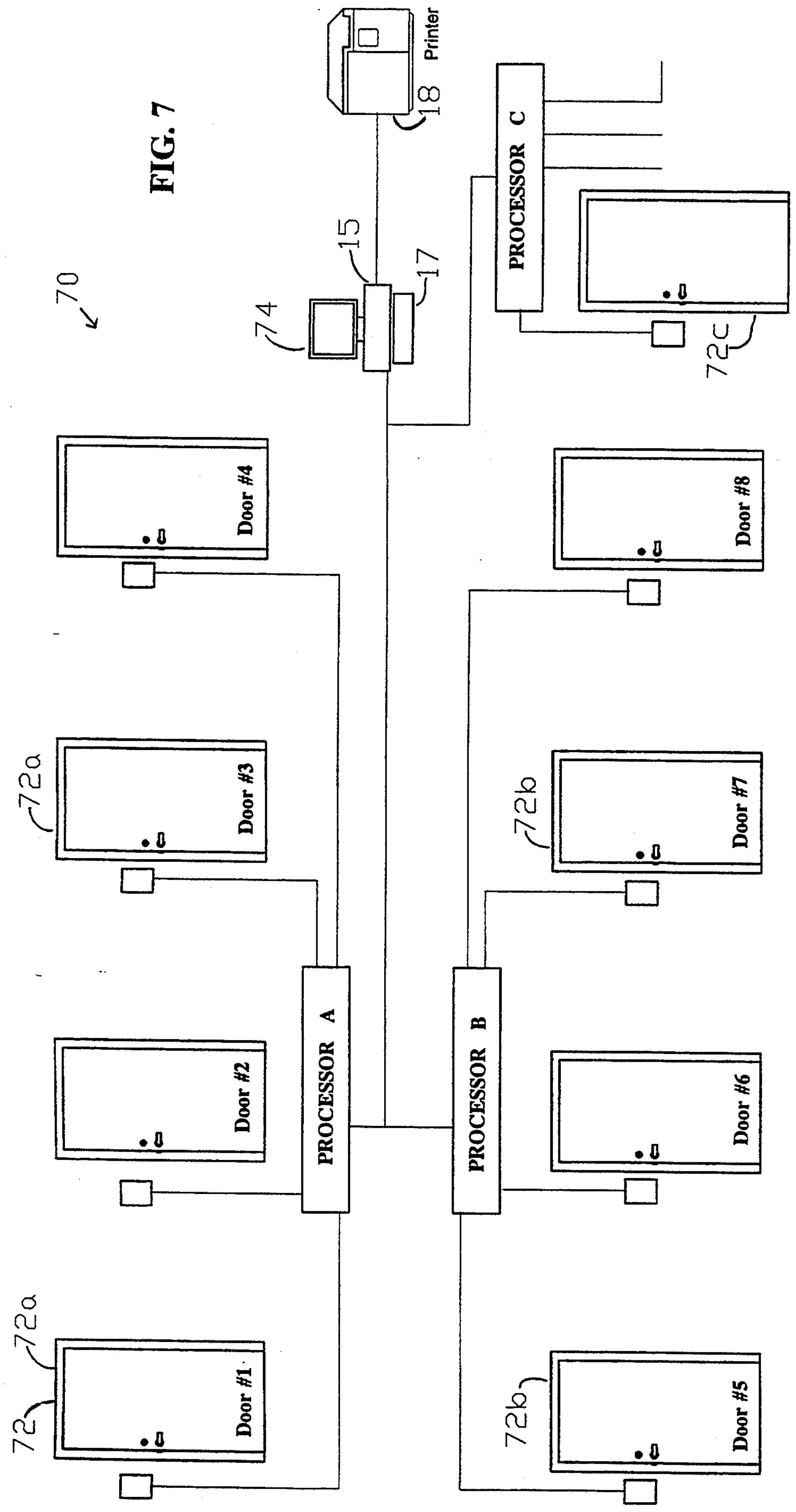
FIG. 7 is a schematic diagram showing an embodiment of a system of the invention wherein access control points are formed into groups.

FIG. 7 shows schematically a variation of what has been described in the other drawing figures. In FIG. 7 an access control system 70 in accordance with the invention includes a large plurality of high-security access control points 72 (labeled in FIG. 7 as 72*a*, 72*b* and 72*c*). Each of these access control points 72 may be similar in most respects to the high-security access control points 12 shown in FIGS. 3, 4 and 5.

However, in the embodiment shown in FIG. 7 these access control points 72 are grouped into an "A" group, a "B" group and a C group. The A group of access control points 72*a* are each connected to a processor A, with the B group connected to a processor B and the C group connected to a processor C. The access control points within a group are Physically located close to one another, so that they can easily be connected, as by a two-conductor wire, to the processor for the group.

Each of the processors A, B and C serves the function of the small processor 46, but is of somewhat larger capacity so that a group of access control points can be served.

The system 70 also includes a central processor 15 such as described above with reference to FIGS. 1, 4 and 5. With the group processors being of larger capacity than the local processors 46 in the earlier embodiment, the processor 15 may be used to program the group processors A, B and C to handle some functions which otherwise would have been performed by the main processor 15. This can include the date/time control information discussed above, which can also be used to exclude certain personnel (by ID number or key number) who should no longer have access, such as discharged employees.

The processor 15 is also used, as in the previous embodiment, for maintaining a database and for receiving reports from the processors A, B and C and for itself generating reports. The printer 18 may be included, as above, as well as a display monitor 74.

Figure 9:
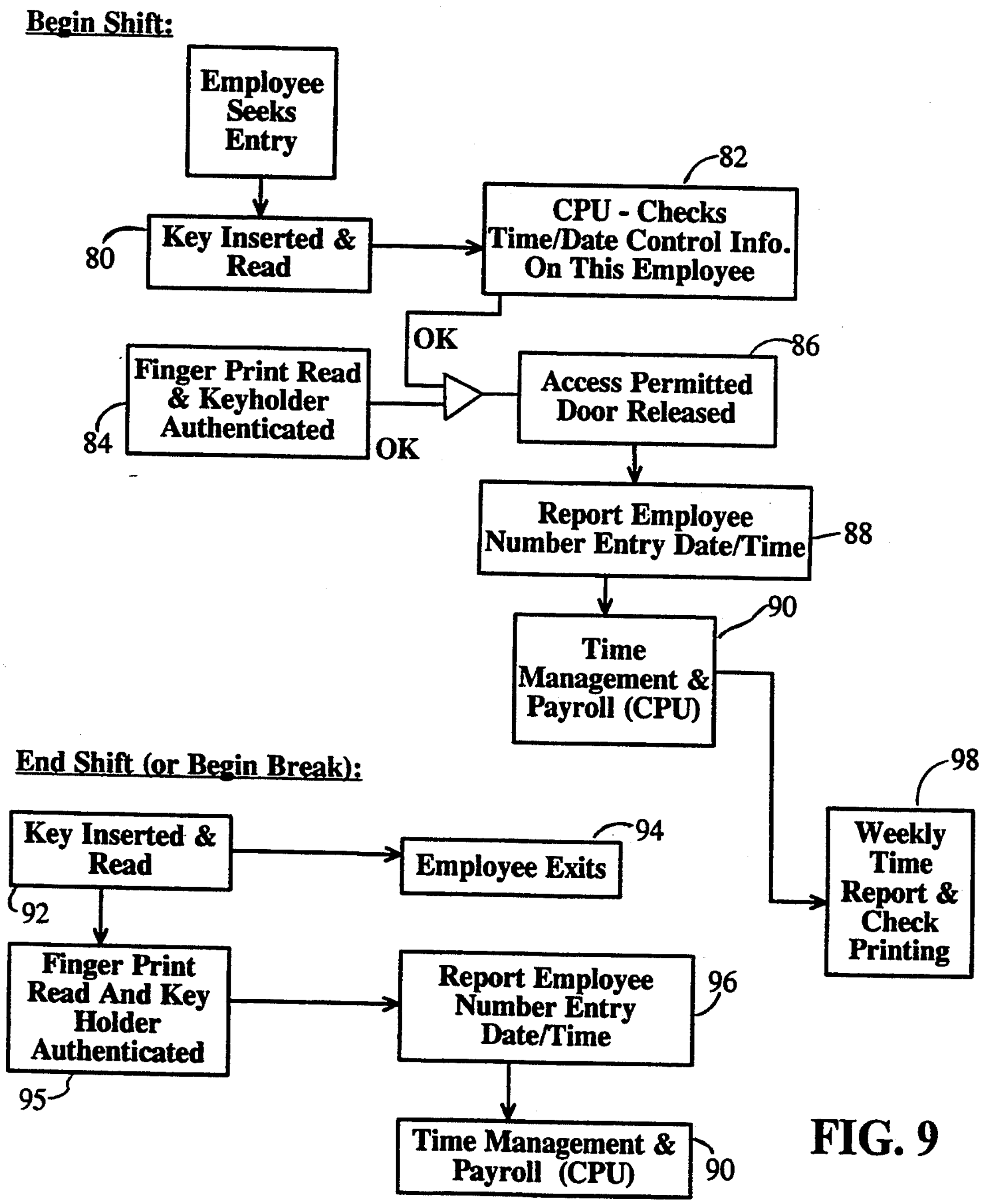
FIG. 9 is a flow diagram illustrating the use of the access control system of the invention with an employee time management and payroll system.

FIG. 9 is a simple block diagram illustrating the interconnection of the system of the invention with an employee time management system, as for time and payroll management of hourly employees. FIG. 9 shows that an employee on beginning a work shift will approach one or more high-security entry doors (which can include non-authenticating access points 12*b* shown in FIG. 1). The employee inserts his key, which is read at least for the employee number or ID number (block 80), and preferably also is read for the authenticating feature as indicated in the figure. After the central processor checks a database for time/date control (block 82), and the employee is approved to enter at this time, and assuming keyholder authentication is positive, if necessary, as in the block 84, the door is released and access is permitted (block 86). This causes a report 88 to be created, indicating the date and time of entry and the employee identity. The report is sent to time management and payroll 90, which may be operated by the central processor.

When the same employee exits, at the end of a shift or for a meal break, he again inserts his key, but into a key reader at the inside of the door, which signifies that he is exiting. This is indicated in the block 92. Keyholder authentication (block 95) preferably is again required to assure that the proper employee is checking himself out. The employee removes his key and exits (block 94). The opening of the door itself does not require keyholder authentication or even key insertion, but properly taking these steps is in the employee's interest for payroll records. A report 96 is generated, which goes to time management and payroll 90. The record of the employee's entry and exit times enables the compilation of a weekly (or biweekly, monthly, etc.) time report and the automatic printing of checks for the employee (block 98).

Figure 11:
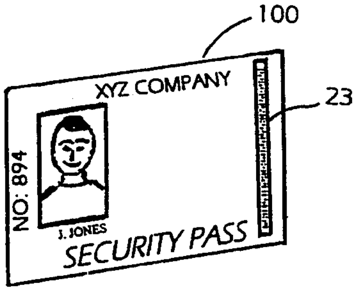
FIG. 11 is a view similar to FIG. 10, showing a card with encoded data representing a personal biometric identifying feature of the keyholder and also a photograph of the keyholder, so that the card can be used as a security pass as well as an authenticating pass for high security access.

FIGS. 10 and 11 show card type access control devices encompassed by the invention. The credit card type key 16*a* of FIG. 10 was discussed above. In FIG. 11 a different type of card 100 is shown, not necessarily containing any locks accessing feature such as the feature 21 shown in FIG. 10. The card 100 serves as an ID card or security pass, preferably with a photograph 102 of the intended bearer. It also serves as an access control device, having a biometric feature (e.g. fingerprint) encoded in a strip of encoded data 23. Thus, the card 100 is used by the bearer for accessing high-security access points in the manner described with reference to FIGS. 1 and 3 through 9, while also serving as a security pass visual inception. A principal difference is that the card 100 may not be capable of directly accessing any lock.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A mechanical key with keyholder authentication, comprising, a mechanical key with a mechanical configuration providing lock access features, operable to permit access to open a lock having cooperating mechanical features, encoded user authentication data physically located on the key without limiting the mechanical lock opening ability of the key, the encoded data comprising a personal identifying number (PIN) known to the intended keyholder, such personal identifying number being capable of use for verification and authentication that a keyholder is the intended keyholder by comparison of the personal identifying number to a number separately input by the keyholder to gain access.

2. The apparatus of claim 1, further including an access control point having key reader means for reading the encoded user authentication data located on the key when the key is placed adjacent to said reader means, and the access control point further including keypad means for receiving entry of a PIN number by a keyholder and comparison means for comparing the entered PIN number with the data read from the key, with means for permitting the keyholder access at the access control point if a match is found by said comparison means, and said access control point not including said lock having cooperating mechanical features to the mechanical configuration of said mechanical key, so that the mechanical configuration is not usable at said access control point to gain access.

3. A mechanical key with keyholder authentication, comprising, a mechanical key with a mechanical configuration providing lock access features, operable to permit access to open a lock having cooperating mechanical features, encoded user authentication data physically located on the key without limiting the mechanical lock opening ability of the key, the encoded data comprising a personal biometric feature of and unique to a particular intended keyholder, such encoded biometric feature being capable of authenticating the intended keyholder and differentiating from other keyholders having keys with encoded data, by comparison of the encoded biometric feature to separate information or data to be input by the keyholder to gain access.

4. The apparatus of claim 3, further including an access control system including one access control point having key reader means for reading the encoded user authentication data located on the key when the key is placed adjacent to said key reader means, and the access control point further including biometric feature reader means for reading the keyholder's actual biometric feature and comparison means for comparing the read actual biometric feature with the data read from the key, with means for permitting the keyholder access at the access control point if a match is found by said comparison means, and said one access control point not including said lock having cooperating mechanical features to the mechanical configuration of said mechanical key, but the system including another access control point with said lock having cooperating mechanical features.

5. The apparatus of claim 3, wherein the encoded biometric feature comprises a digitized representation of the fingerprint of the intended keyholder.

6. The apparatus of claim 3, wherein the encoded biometric feature comprises digitized representations of the fingerprints of two or more persons, whereby the key may be used in an access control system with a fingerprint reader and a reader for the encoded data, with the presence of two or more specific persons required, as verified via the fingerprint reader, before entry can be granted.

7. The apparatus of claim 3, wherein the encoded biometric feature comprises digitized representations of a photographic image of the intended keyholder, whereby the key may be used in an access control system wherein the data encoded on the key is read by a reader and a reproduction of the intended keyholder's photographic image is generated for comparison with an actual keyholder's appearance.

8. The apparatus of claim 3, wherein the encoded biometric feature comprises digitized representations of a retina scan of the intended keyholder, whereby the key may be used in an access control system wherein the data encoded on the key is read by a reader and a reproduction of the intended keyholder's retina scan is generated for comparison with a keyholder's actual retina scan as determined by a retina scanner at the access control point.

* * * * *